March 23, 1954     W. B. SMITH     2,672,720
COTTON-PICKING SPINDLE AND DRIVE CONSTRUCTION
Filed April 3, 1950     2 Sheets-Sheet 1

Inventor
William Burris Smith
By
Attorney.

March 23, 1954 W. B. SMITH 2,672,720
COTTON-PICKING SPINDLE AND DRIVE CONSTRUCTION
Filed April 3, 1950 2 Sheets-Sheet 2
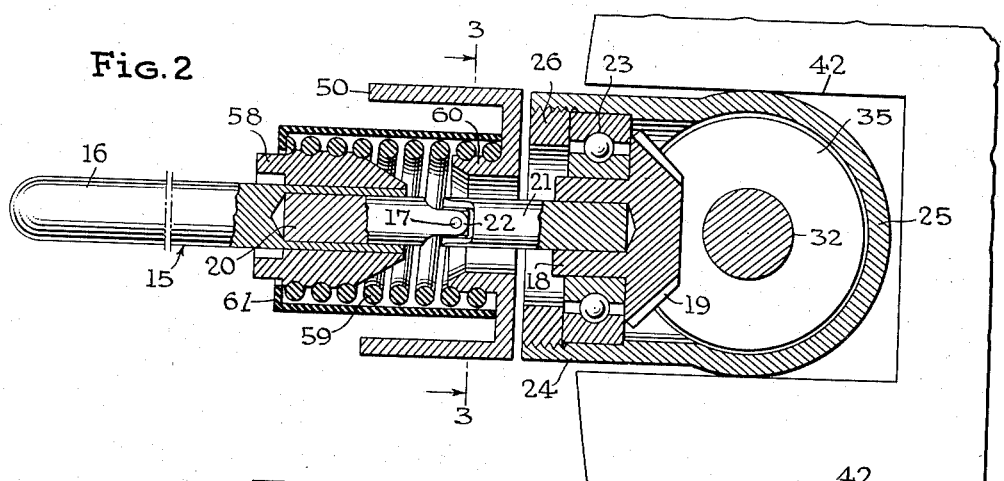
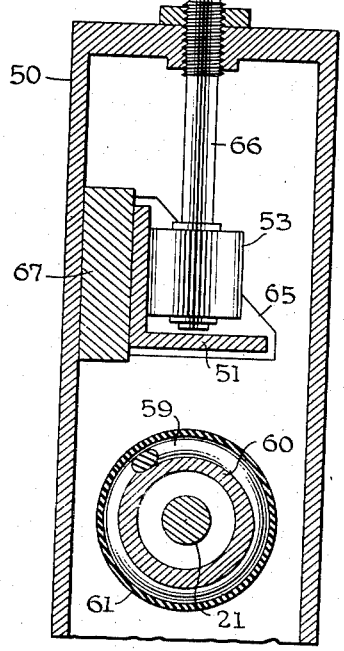
Inventor
William Burris Smith
By
Attorney.

Patented Mar. 23, 1954

2,672,720

UNITED STATES PATENT OFFICE 2,672,720

COTTON-PICKING SPINDLE AND DRIVE CONSTRUCTION

William B. Smith, Greenville, Miss., assignor of one-half to Hugh A. Gamble, Greenville, Miss.

Application April 3, 1950, Serial No. 153,600

9 Claims. (Cl. 56—41)

This invention relates to cotton harvesters and more particularly to improvements in rotary type cotton picking spindles and in the drive mechanisms therefor.

The spindle type cotton picker as shown, for example, in Patent 1,747,566 issued to Hiram N. Berry, February 18, 1930, comprises a plurality of rotatable picking spindles supported by and projecting from a rotary drum or cylinder. The drum is rotated on a vertical axis and moved along the side of a row of cotton plants while the vertical rows of rotary picking spindles are successively projected into the plants to wind off the cotton fibers. The rotary picking spindles wind off or extract the cotton fibers from the bolls of the cotton plants by engaging the fibers and wrapping or winding the fibers on the spindles as the spindles rotate. The picked cotton on the spindles is removed therefrom after the spindles are withdrawn from the cotton plants by vertically arranged laterally movable stripper bars through which the spindles project. The projecting picking spindles are subject to damage by being bent or broken during engagement with large stalks or branches of cotton plants unless the spindles are flexible or flexibly mounted to permit them to be deflected without bending or breaking. The present invention relates to a modified flexible rotary spindle construction and to the mounting and driving arrangements for such spindles.

It is an object of this invention to provide an improved flexible rotary cotton picking spindle and spindle drive for use in rotary type cotton pickers.

It is another object of this invention to provide a flexible cotton picking spindle construction in which the spindle is prevented from being damaged by unusual deflections, and in which the rotary spindle is supported so as to prevent whipping action, and in which the flexible spindle drive does not permit the spindle to be stretched outwardly.

It is another object of this inventtion to provide flexible spindles with an improved driving construction which assures uniform rotation of each spindle of a vertical series of flexible spindles.

It is still another object of this invention to provide an improved frictional drive for a series of flexible spindles operated to rotate the flexible spindles after they have penetrated the cotton plants.

Other objects and advantages of this invention will be readily apparent to those skilled in the art from examination of the following description of the preferred embodiments illustrated in the accompanying drawings wherein:

Figure 2 is an enlarged fragmentary sectional view of the device taken along line 2—2 of Figure 1.

Figure 3 is an enlarged sectional view of the device taken along line 3—3 of Figure 2.

Figure 1:
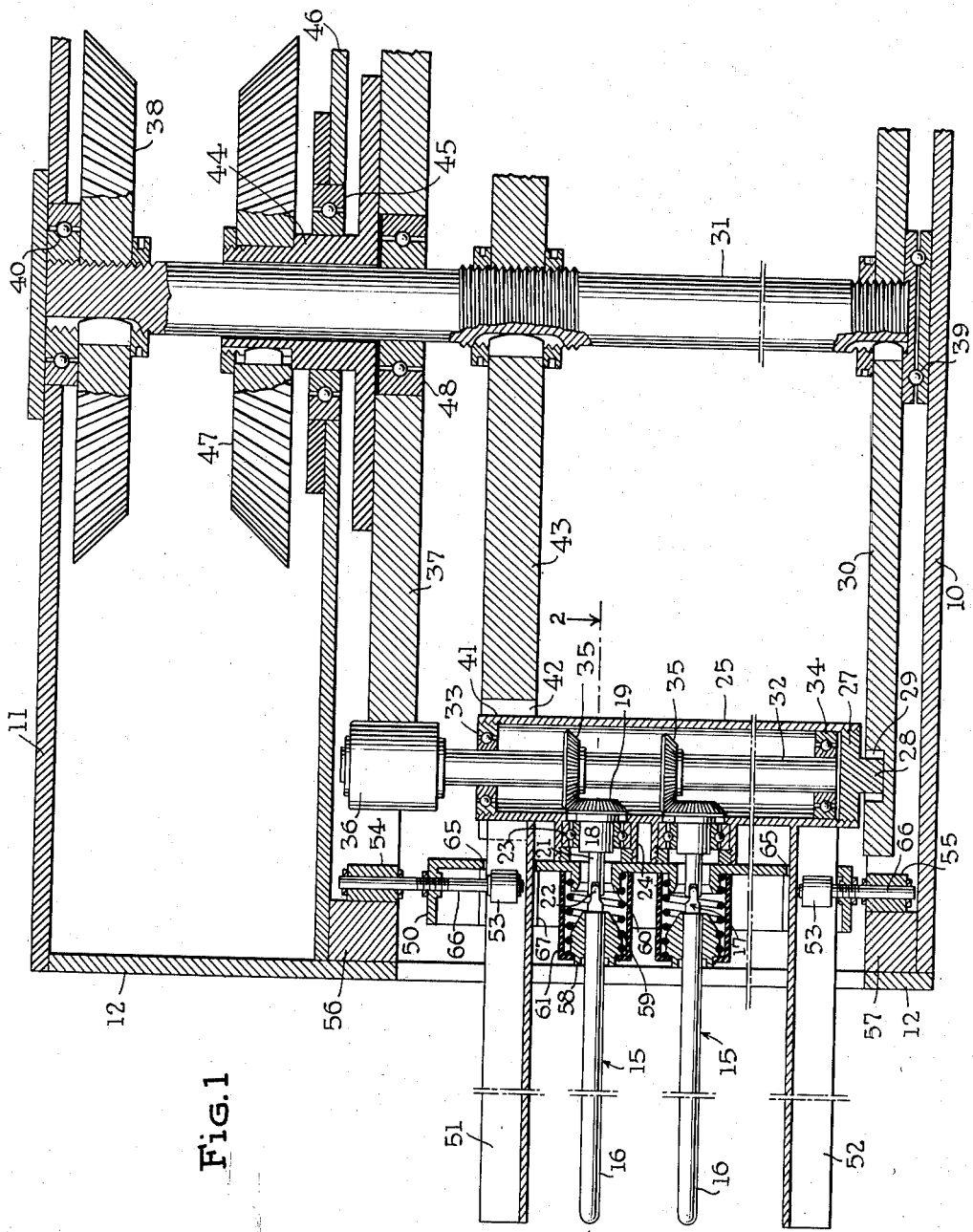
Figure 1 is a fragmentary elevational view of a cotton picking unit with parts broken away and shown in section.

Referring to Figure 1 of the drawings, the horizontal base plate of a rotary cotton picker is indicated by the numeral 10. The plate 10 is connected to the top plate 11 by a vertical apertured side plate 12 to form a partial enclosure for the spindle carrying and driving mechanisms to be described hereinafter. The general arrangement of this type of cotton picker is shown in the copending application of Hugh A. Gamble, Serial Number 787,052, filed November 20, 1947, now Patent 2,540,046, to which reference is hereby made.

A rotary picking spindle is indicated by the numeral 15, a complete picker assembly including about thirty-six vertical rows of eighteen spindles each. In Figure 1, only two spindles 15 of such a vertical row are shown, in order to simplify the drawings. The spindle 15 includes a picking portion 16, which may be longitudinally fluted and notched in a conventional manner as shown for example in Patent No. 1,818,444 issued to L. E. Wirth on August 11, 1931. Each spindle 15 is connected by a flexible member to the hub 18 of a driving gear 19. The flexible member may be two forked members 20 and 21 connected by pivot pins 17 forming a conventional universal joint 22, as shown in Figure 2. The member 20 may be brazed or soldered in a recess in the end of picking portion 16, and the member 21 may be brazed or soldered in a recess in the hub 18. The sleeve 18 may be the hub of the bevel gear 19, as shown in Figure 2. The hub or sleeve 18 is mounted for rotation in a ball bearing 23, the bearing being clamped in a tubular housing 24 projecting laterally from the vertical supporting tube 25. A threaded ring 26 may be used to secure the bearing 23 in its housing 24. The housing 24 may be welded to the supporting tube 25 or may be formed integral therewith.

There is a vertical tube 25 for each vertical row of spindles 15. The lower end of each tube 25 may be closed by a plug 27 having a projecting stud member 28. The member 28 is positioned in a suitable socket 29 in a rotatable disc 30, the latter being adapted to rotate with the vertical drive shaft 31. The stud 28 and socket 29 permit the tube 25 to be tilted with respect to or to be moved toward the axis of shaft 31. Within the tube 25, a rotary shaft 32 is journaled in ball bearings 33 and 34. The shaft 32 has a plurality of driving gears 35 secured thereon in engagement with the bevel gear 19 of each spindle assembly. Near the top of tube 25, the shaft 32 is provided with a driving roller 36 secured thereto and adapted to engage the periphery of a driving disc 37, the latter being supported to rotate about the shaft 31 in a direction opposite to the direction of rotation of shaft 31. Shaft 31 may be continuously driven from a suitable source of power (not shown) through the bevel gear 38. Ball bearings 39 and 40 are provided for shaft 31 and may be secured to base plate 10 and top plate 11, respectively. The upper end 41 of each tube 25 is positioned in a radial slot 42 of a disc 43. Disc 43 is secured to and carried by the shaft 31. The driving disc 37 is carried by a hub 44 journalled in a bearing 45 carried by a horizontal plate 46 secured to the side plate 12 and spaced downward from the top plate 11. The hub 44 is keyed to a bevel gear 47 adapted to be driven from the same source of power which drives gear 38, the gears 47 and 38 being driven in opposite directions. A suitable ball bearing 48 may be provided between the disc 37 and shaft 31.

The stripper mechanism may include a vertical bar 50 for each vertical row of picking spindles 15. The stripper bar 50 is supported by guide bars 51 and 52 secured to and projecting laterally from the tube 25. The guide bars 51 and 52 extend through suitable openings 65 in the stripper bar 50 and a roller type bearing 53 carried by a stud 66 supported by the stripper bar 50 may be provided to permit the stripper bar to be moved back and forth freely on the guide bars. A wear plate 67 may be secured to the flange portion of the stripper bar 50 for engagement with the guide bar 51. The stripper bar 50 may be channel-shaped cross-section and is provided with flanged apertures through which the spindles 15 project. The upper and lower ends of each stripper bar 50 are provided with rollers 54 and 55 mounted on studs 66, and the rollers 54 and 55 engage cams 56 and 57 for guiding the path of travel of the stripper bars. The cams 56 and 57 may be similar to those shown in the above-mentioned application of Hugh A. Gamble. After a row of picking spindles 15 has penetrated a cotton plant or plants, the cams 56 and 57 shift the stripper bar 50 toward the drive shaft 31 causing the stripper bar 50 to engage the projecting portions 24 of tube 25 and thereby tilt or shift the tube 25 until the driving roller 36 makes frictional contact with the periphery of driven disc 37, thereby causing shaft 32 to rotate a vertical row of the spindles 15 in the cotton plants. The stripper bar 50 also serves to stabilize the rotating spindle by means of a bearing sleeve 58 supported by a coil spring 59 secured to a flange or shoulder 60 of the bar 50. The sleeve 58 resiliently supports the spindle 15 outward of the flexible portion of the spindle, and thereby tends to prevent whipping action of the spindle during rotation. As shown in Figure 2, the coil spring 59 may be provided with a guard or shield 61 of rubber and enclosing the spring to prevent cotton fibers from becoming tangled in the spring. The flexible connector between spindle portion 16 and hub 18 may be a universal joint coupling 22 as shown in Figures 1 and 2. The flexible connector permits the picking portion of the spindle to be deflected when struck by stalks of the cotton plant, thereby avoiding bending or breakage of the spindles. The flexible connection prevents the spindle from being drawn or stretched outward from its supports and bearings if a heavy stalk should become caught between several adjacent spindles, and the spring 59 returns the spindle to normal position after it is disengaged from the stalk of the plant.

A cotton picker having the improved spindle and drive arrangements shown herein operates in a manner to that described in my copending application Serial Number 98,839, now Patent No. 2,605,600, issued August 5, 1952. After a vertical row of spindles has been rotated in the cotton plants and has passed from the cotton plants, the cams 56 and 57 cause the stripper bar to move outward from the shaft 31 thereby permitting roller 36 to disengage from driving disc 37 to stop spindle rotation. The stripper bars are then moved further in the outward direction to cause the sleeve or bushing 58 to strip or doff cotton fibers from the spindles 16 for collection by pneumatic or other means, as is well understood in the art.

This invention contemplates the use of various forms of bearings, guards, drive connections, and the like, as it will be readily apparent to those skilled in the art that many such variations are possible within the scope of the following claims.

I claim:

1. In a cotton harvester movable along a row of cotton plants and having a picking unit including vertical rows of rotatable picking spindle assemblies supported for movement into and out of said cotton plants, a picking spindle and drive assembly comprising in combination, a plurality of cotton picking rotary spindle members, a driving gear for rotating each of said spindle members, flexible drive couplings connecting each of said gears to said spindle members, a rotatable vertical shaft, gears on said shaft in engagement with said spindle member driving gears, and driving means frictionally engageable with said shaft for rotating said shaft, gears, flexible couplings, and cotton picking spindle members.

2. In a cotton harvester movable along a row of cotton plants and having a picking unit including vertical rows of rotatable picking spindle assemblies supported for movement into and out of said cotton plants, a picking spindle and drive assembly comprising in combination, a plurality of cotton picking rotary spindle members, a driving gear for rotating each of said spindle members, universal drive couplings connecting each of said gears to said spindle members, a rotatable vertical shaft for each of said vertical rows of spindle assemblies, gears on said shaft in engagement with said spindle member driving gears, and driving means frictionally engageable with the upper end of said shaft for rotating said shaft, gears, universal couplings, and cotton picking spindle members.

3. In a cotton harvester movable along a row of cotton plants and having a picking unit including vertical rows of rotatable picking spindle assemblies supported for movement into and out of said cotton plants, a picking spindle and drive assembly comprising in combination, a plurality of horizontally-extending cotton picking rotary spindle members, a driving gear for each of said spindle members, universal couplings connecting each of said gears to said spindle members, a rotatable vertical shaft, gears on said shaft in engagement with said member driving gears, a bearing sleeve for and engaging a portion of each of said spindle members, resilient means engaging said sleeve for supporting said sleeve, and driving means engageable with said shaft for rotating said shaft, gears, universal couplings, and cotton picking members.

4. In a cotton harvester movable along a row of cotton plants and having a picking unit including rows of rotatable picking spindles supported for movement into and out of said cotton plants, a rotary picking spindle assembly comprising in combination, a cotton picking rotary spindle member, a driving member, a universal coupling connecting said cotton picking spindle member to said driving member, and a resiliently supported bearing sleeve engaging said cotton picking spindle member adjacent to said universal coupling.

5. A rotary picking spindle assembly as defined in claim 4 in which said universal coupling comprises a pair of members having forked-ends and pivot means connecting said forked ends, said members and pivot means forming a universal joint coupling.

6. In a cotton harvester movable along a row of cotton plants and having a picking unit including vertical rows of rotatable picking spindles supported for movement into and out of said cotton plants, a rotary picking spindle assembly comprising in combination, a cotton picking rotary spindle member, a driving member, a universal coupling connecting said cotton picking spindle member to said driving member, a bearing sleeve engaging said cotton picking member adjacent said universal coupling, and a coil spring adapted to be secured to said harvester and engaging said bearing sleeve and surrounding said coupling for resiliently supporting said bearing sleeve and said cotton picking member.

7. A rotary picking spindle assembly as defined in claim 6 and including a flexible guard enclosing said coil spring.

8. In a cotton harvester movable along a row of cotton plants and having a picking unit including vertical rows of rotatable picking spindles supported for movement into and out of said cotton plants, a picking spindle and drive assembly comprising in combination, a vertical row of cotton picking rotary spindle members, rotatable driving gears for each of said spindle members, universal couplings connecting said gears to said spindle members, a vertical tube supporting said driving gears, a rotatable shaft within said tube, gears on said shaft engaging said spindle member driving gears, guide bars extending outward from said tube at the top and at the bottom of said vertical row of picking members, a stripper bar slideably supported on said guide bars and having apertures through which said picking spindle members extend, bearing sleeves engaging said picking spindle members adjacent said universal couplings, and spring means secured to said bearing sleeves and to said stripper bar for resiliently supporting said bearing sleeves and said cotton picking spindle members.

9. A picking spindle and drive assembly as defined in claim 8 including rotary driving means frictionally engageable with said shaft for rotating said shaft, gears, universal couplings, and picking spindle members, and cams engaging the ends of said stripper bar for shifting said bar and said tube laterally for engaging said shaft with said rotary driving means.

WILLIAM B. SMITH.

References Cited in the file of this patent

UNITED STATES PATENTS

| Number | Name | Date |
| --- | --- | --- |
| 243,132 | Hastings | June 21, 1881 |
| 407,360 | Manning | June 23, 1889 |
| 574,218 | Rawl | Dec. 29, 1896 |
| 1,145,174 | Volkmann | July 6, 1915 |
| 1,786,851 | Johnston et al. | Dec. 30, 1930 |
| 2,540,046 | Gamble | Jan. 30, 1951 |